United States Patent
Zhang et al.

(10) Patent No.: US 9,429,811 B2
(45) Date of Patent: Aug. 30, 2016

(54) DISPLAY PANEL AND DISPLAY METHOD THEREOF AND DISPLAY APPARATUS

(71) Applicants: BOE TECHNOLOGY GROUP CO., LTD, Beijing (CN); BEIJING BOE DISPLAY TECHNOLOGY CO., LTD., Beijing (CN)

(72) Inventors: Chunbing Zhang, Beijing (CN); Bin Yan, Beijing (CN); Zheng Wang, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 176 days.

(21) Appl. No.: 14/516,142

(22) Filed: Oct. 16, 2014

(65) Prior Publication Data
US 2015/0362821 A1    Dec. 17, 2015

(30) Foreign Application Priority Data
Jun. 17, 2014 (CN) ............ 2014 1 0270198

(51) Int. Cl.
*G02F 1/167* (2006.01)
*G02F 1/133* (2006.01)
*G09G 3/34* (2006.01)

(52) U.S. Cl.
CPC ........ *G02F 1/167* (2013.01); *G02F 2001/1678* (2013.01); *G09G 3/344* (2013.01)

(58) Field of Classification Search
CPC ............ G02F 1/167; G02F 1/134309; G02F 1/13306; G02F 2001/1676; G02F 2001/1672; G02F 2001/1678; G09G 3/344

USPC .......................................... 345/107; 356/296
See application file for complete search history.

(56) References Cited

U.S. PATENT DOCUMENTS

| 5,904,790 A | * | 5/1999 | Sheridon | G02B 26/026 156/250 |
| 6,515,790 B2 | * | 2/2003 | Miyamoto | G02F 1/167 345/107 |

(Continued)

FOREIGN PATENT DOCUMENTS

| CN | 201066422 Y | 5/2008 |
| CN | 102375281 A | 3/2012 |

(Continued)

OTHER PUBLICATIONS

First Chinese Office Action (including English translation) dated Jun. 29, 2016, received for corresponding Chinese Application No. 201410270198.5.

*Primary Examiner* — Temesghen Ghebretinsae
*Assistant Examiner* — Benyam Ketema
(74) *Attorney, Agent, or Firm* — Kinney & Lange, P.A.

(57) ABSTRACT

The present disclosure provides a display panel, a display method and a display apparatus. The display panel comprises: a first transparent substrate and a second transparent substrate; a plurality of double sided light emitting pixel units located between the transparent substrates; first electrophoresis units located outside of the first transparent substrate; and second electrophoresis units located outside of the second transparent substrate. Each of the electrophoresis units comprises electrophoresis particles having a first arrangement mode and a second arrangement mode. If the electrophoresis particles in any one electrophoresis unit are in the first arrangement mode, the any one electrophoresis unit reflects a light emitted from the pixel unit; while if the electrophoresis particles in any one electrophoresis unit are in the second arrangement mode, the any one electrophoresis unit absorbs an ambient light passing through the pixel unit.

20 Claims, 2 Drawing Sheets

(56) References Cited

U.S. PATENT DOCUMENTS

| | | | | |
|---|---|---|---|---|
| 7,492,497 B2 * | 2/2009 | Paolini, Jr. | ............... | G02F 1/167 345/84 |
| 8,928,575 B2 * | 1/2015 | Moriya | ............... | G09G 3/344 345/107 |
| 2002/0015831 A1 * | 2/2002 | Sheridon | ............... | G02B 26/026 428/195.1 |
| 2002/0033793 A1 * | 3/2002 | Machida | ............... | G02F 1/167 345/107 |
| 2002/0135861 A1 * | 9/2002 | Nakao | ............... | G02F 1/167 359/296 |
| 2002/0145792 A1 * | 10/2002 | Jacobson | ............... | B41J 2/01 359/296 |
| 2002/0196216 A1 * | 12/2002 | Tokuyo | ............... | G09F 9/372 345/84 |
| 2002/0196219 A1 * | 12/2002 | Matsunaga | ............... | G09G 3/344 345/87 |
| 2003/0048370 A1 * | 3/2003 | Koyama | ............... | G09G 3/344 348/311 |
| 2003/0063076 A1 * | 4/2003 | Machida | ............... | G09G 3/2085 345/204 |
| 2003/0231162 A1 * | 12/2003 | Kishi | ............... | G02F 1/167 345/107 |
| 2004/0169912 A1 * | 9/2004 | Liang | ............... | G02F 1/167 359/296 |
| 2005/0035941 A1 | 2/2005 | Albert et al. | | |
| 2006/0289857 A1 * | 12/2006 | Kuo | ............... | H01L 27/3286 257/40 |
| 2007/0064173 A1 * | 3/2007 | Chiu | ............... | G02F 1/133603 349/69 |
| 2007/0194702 A1 * | 8/2007 | Jeng | ............... | H01L 27/326 313/506 |
| 2007/0195399 A1 * | 8/2007 | Aylward | ............... | G02F 1/1347 359/296 |
| 2007/0207571 A1 * | 9/2007 | Morisue | ............... | H01L 27/1214 438/107 |
| 2008/0024427 A1 * | 1/2008 | Kuo | ............... | G02F 1/136204 345/107 |
| 2008/0272987 A1 * | 11/2008 | Lee | ............... | G02F 1/167 345/55 |
| 2008/0316581 A1 * | 12/2008 | Moriya | ............... | G02F 1/167 359/296 |
| 2010/0164903 A1 * | 7/2010 | Lee | ............... | G06F 3/0412 345/174 |
| 2011/0007046 A1 * | 1/2011 | Tsai | ............... | G02B 26/005 345/207 |
| 2012/0250141 A1 * | 10/2012 | Chen | ............... | G02B 1/06 359/320 |

FOREIGN PATENT DOCUMENTS

| | | |
|---|---|---|
| CN | 103094312 A | 5/2013 |
| CN | 103353701 A | 10/2013 |
| JP | 2013037247 A | 2/2013 |
| KR | 20130045125 A | 5/2013 |

* cited by examiner

DISPLAY PANEL AND DISPLAY METHOD THEREOF AND DISPLAY APPARATUS

CROSS-REFERENCE TO RELATED APPLICATION

This application claims the benefit of Chinese Patent Application No. 201410270198.5 filed on Jun. 17, 2014 in the State Intellectual Property Office of China, the whole disclosure of which is incorporated herein by reference.

BACKGROUND OF THE INVENTION

1. Field of the Invention

The present disclosure relates to a technical field of display, more particularly, relates to a display panel, a display method for the display panel and a display apparatus.

2. Description of the Related Art

As the information transmission evolves and light and thin electronic products develop, the requirements of the people to the display panel are varying continuously. For example, applications for bulletin boards of public traffic hub, information display plates on windows of a business hall need the display apparatus can achieve a double-sided display in convenience of users. Further, portable electronic products also need the double-sided display to extend the picture space and switch and process more operations rapidly.

At present, the double sided display panel in industries is typically formed as follows: for example, it may be formed by adhering two single sided display panels to each other, each of which has its separate driving system. However, in this way, the cost for producing the double sided display panel is relatively high and the resultant double-sided display panel has a relatively large thickness, and thus the effect is not good; alternatively, for example, it may be formed by providing two light emitting regions, each of which has a reflective layer to reflect a light in a direction opposite to the light emitting direction, on the same substrate, the two light emitting regions having different light emitting directions. However, in this way, when a light emitting region is in a non-display state, it still reflects the ambient light, which causes an undesired contrast for the ambient light. Also for example, two light emitting regions are provided on the same substrate with electrophoresis layers on both sides thereof such that a certain light emitting region may absorb the ambient light when it is in the non-display state. However, in this way, when the light emitting region is in a display state, the electrophoresis layers will not reflect the light in the direction opposite to the light emitting direction, which causes undesired display brightness.

SUMMARY OF THE INVENTION

The present disclosure provides a display panel, a display method for the display panel and a display apparatus. With technical solutions disclosed herein, a light and thin double-sided display apparatus may be achieved with relative low costs and may have relative high display brightness and ambient light contrast.

According to an embodiment of the present invention, it provides a display panel comprising: a first transparent substrate and a second transparent substrate opposed to each other; a plurality of double sided light emitting pixel units located between the first transparent substrate and the second transparent substrate and arranged in a matrix; a plurality of first electrophoresis units located outside of the first transparent substrate and corresponding to odd numbered rows of the pixel units one by one; a plurality of second electrophoresis units located outside of the second transparent substrate and corresponding to even numbered rows of the pixel units one by one, wherein each of the first electrophoresis units and the second electrophoresis units comprises a plurality of electrophoresis particles having a first arrangement mode and a second arrangement mode, and wherein if the electrophoresis particles in any one electrophoresis unit of the first electrophoresis units and the second electrophoresis units are in the first arrangement mode, the any one electrophoresis unit reflects a light emitted from the pixel unit corresponding to the any one electrophoresis unit while if the electrophoresis particles in any one electrophoresis unit of the first electrophoresis units and the second electrophoresis units are in the second arrangement mode, the any one electrophoresis unit absorbs an ambient light passing through the pixel unit corresponding to the any one electrophoresis unit.

According to an embodiment of the present invention, it provides display apparatus comprising a display panel, the display panel comprising:

a first transparent substrate and a second transparent substrate opposed to each other;

a plurality of double sided light emitting pixel units located between the first transparent substrate and the second transparent substrate and arranged in a matrix;

a plurality of first electrophoresis units located outside of the first transparent substrate and corresponding to odd numbered rows of the pixel units one by one;

a plurality of second electrophoresis units located outside of the second transparent substrate and corresponding to even numbered rows of the pixel units one by one, wherein each of the first electrophoresis units and the second electrophoresis units comprises a plurality of electrophoresis particles having a first arrangement mode and a second arrangement mode, and wherein if the electrophoresis particles in any one electrophoresis unit of the first electrophoresis units and the second electrophoresis units are in the first arrangement mode, the any one electrophoresis unit reflects a light emitted from the pixel unit corresponding to the any one electrophoresis unit while if the electrophoresis particles in any one electrophoresis unit of the first electrophoresis units and the second electrophoresis units are in the second arrangement mode, the any one electrophoresis unit absorbs an ambient light passing through the pixel unit corresponding to the any one electrophoresis unit.

According to an embodiment of the present invention, it provides a display method for a display panel, the display panel comprising:

a first transparent substrate and a second transparent substrate opposed to each other;

a plurality of double sided light emitting pixel units located between the first transparent substrate and the second transparent substrate and arranged in a matrix;

a plurality of first electrophoresis units located outside of the first transparent substrate and corresponding to odd numbered rows of the pixel units one by one;

a plurality of second electrophoresis units located outside of the second transparent substrate and corresponding to even numbered rows of the pixel units one by one, wherein each of the first electrophoresis units and the second electrophoresis units comprises a plurality of electrophoresis particles having a first arrangement mode and a second arrangement mode, and wherein if the electrophoresis particles in any one electrophoresis unit of the first electrophoresis units and the second electrophoresis units are in the first arrangement mode, the any one electrophoresis unit reflects a light emitted from the pixel unit corresponding to the any one electrophoresis unit while if the electrophoresis particles in any one electrophoresis unit of the first electrophoresis units and the second electrophoresis units are in the second arrangement mode, the any one electrophoresis unit absorbs an ambient light passing through the pixel unit corresponding to the any one electrophoresis unit, the method comprising:

controlling the arrangement modes of the electrophoresis particles such that the electrophoresis particles in the electrophoresis units corresponding to the pixel units in a display state is in the first arrangement mode while the electrophoresis particles in the electrophoresis units corresponding to the pixel units in a non-display state is in the second arrangement mode.

BRIEF DESCRIPTION OF THE DRAWINGS

The above and other features of the present invention will become more apparent by describing in detail exemplary embodiments thereof with reference to the accompanying drawings. Throughout drawings, same or similar members are indicated by same reference numerals.

DETAILED DESCRIPTION OF PREFERRED EMBODIMENTS OF THE INVENTION

Figure 1:
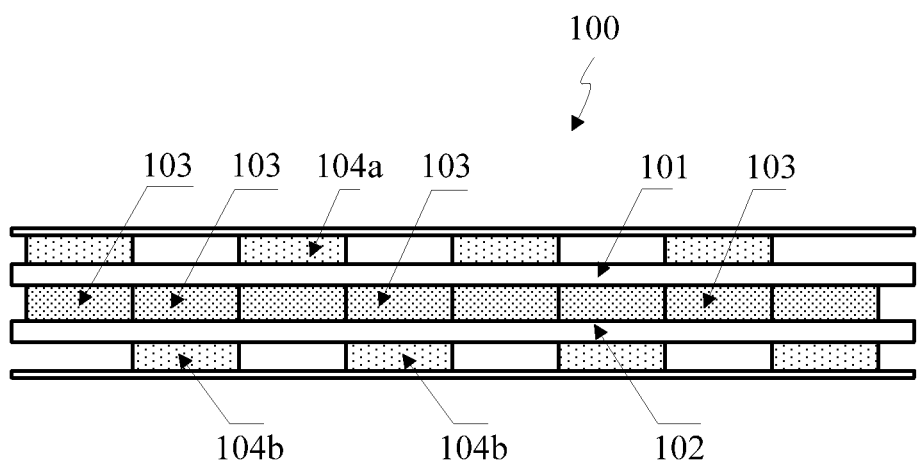
FIG. 1 is an illustrative structure view of a display panel according to an embodiment of the present invention.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

According to a general inventive concept of the present invention, there is provided a display panel comprising: a first transparent substrate and a second transparent substrate opposed to each other; a plurality of double sided light emitting pixel units located between the first transparent substrate and the second transparent substrate and arranged in a matrix; a plurality of first electrophoresis units located outside of the first transparent substrate and corresponding to odd numbered rows of the pixel units one by one; a plurality of second electrophoresis units located outside of the second transparent substrate and corresponding to even numbered rows of the pixel units one by one, wherein each of the first electrophoresis units and the second electrophoresis units comprises a plurality of electrophoresis particles having a first arrangement mode and a second arrangement mode, and wherein if the electrophoresis particles in any one electrophoresis unit of the first electrophoresis units and the second electrophoresis units are in the first arrangement mode, the any one electrophoresis unit reflects a light emitted from the pixel unit corresponding to the any one electrophoresis unit while if the electrophoresis particles in any one electrophoresis unit of the first electrophoresis units and the second electrophoresis units are in the second arrangement mode, the any one electrophoresis unit absorbs an ambient light passing through the pixel unit corresponding to the any one electrophoresis unit.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

As illustrated in FIG. 1, an embodiment of the present invention provides a display panel 100 comprising: a first transparent substrate 101 and a second transparent substrate 102 opposed to each other; a plurality of double sided light emitting pixel units 103 located between the first transparent substrate 101 and the second transparent substrate 102 and arranged in a matrix. In an embodiment, the double sided light emitting pixel units 103 can emit a light towards the first transparent substrate 101 and the second transparent substrate 102 on its both sides respectively. As an example, the pixel unit 103 may be a pixel at least comprising red, green and blue sub-pixels. It may also include a transparent sub-pixel. It may be a red, green, blue or transparent sub-pixel.

In an embodiment, the display panel 100 may further include:

a plurality of first electrophoresis units 104a which are located outside of the first transparent substrate 101 and corresponds to odd numbered rows of the pixel units 103 one by one; and a plurality of second electrophoresis units 104b which are located outside of the second transparent substrate 102 and corresponds to even numbered rows of the pixel units 103 one by one. As illustrated in FIG. 1, the first electrophoresis units 104a and the second electrophoresis units 104b are distributed alternatively on two sides of an assembly composed of the first transparent substrate 101, the pixel units 103 and the second transparent substrate 102, respectively.

As an example, the pixel unit 103 may be at least partially transparent, which may allow at least a part of ambient light to pass through it, in particular when the pixel unit 103 is in a non-display state.

Figure 2:
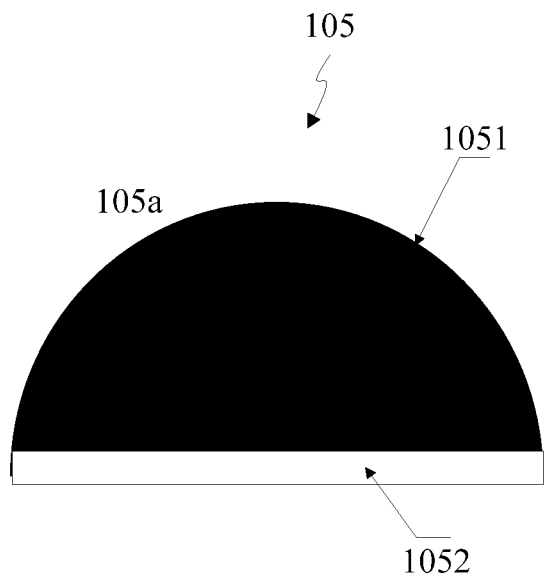
FIG. 2 is an illustrative structure view of electrophoresis particles according to an embodiment of the present invention.

Each of the first electrophoresis units 104a and the second electrophoresis units 104b comprises a plurality of electrophoresis particles (as shown in FIG. 2). In an embodiment, the electrophoresis particles 105 have a first arrangement mode and a second arrangement mode. And if the electrophoresis particles 105 in any one electrophoresis unit of the first electrophoresis units 104a and the second electrophoresis units 104b are in the first arrangement mode, the any one electrophoresis unit reflects a light emitted from the pixel unit 103 corresponding to the any one electrophoresis unit while if the electrophoresis particles 105 in any one electrophoresis unit of the first electrophoresis units 104a and the second electrophoresis units 104b are in the second arrangement mode, the any one electrophoresis unit absorbs an ambient light passing through the pixel unit 103 corresponding to the any one electrophoresis unit.

As an example, the first electrophoresis units 104a and/or the second electrophoresis units 104b may be configured to control the arrangement modes of the electrophoresis particles 105 such that the electrophoresis particles 105 in the electrophoresis units corresponding to the pixel units in a display state are in the first arrangement mode while the electrophoresis particles in the electrophoresis units corresponding to the pixel units 103 in a non-display state are in the second arrangement mode. As an example, the arrangement mode of the electrophoresis particles 105 may include arrangement such as for the direction, posture of the electrophoresis particles 105. By means of controlling the arrangement mode of the electrophoresis particles 105, the first electrophoresis units 104a and the second electrophoresis units 104b may be configured to reflect the light emitted from the pixel units 103 in the display state corresponding to the electrophoresis unit while absorbing the ambient light passing through the pixel units 103 in the non-display state corresponding to the electrophoresis unit.

It should be noted that, when the electrophoresis particles 105 are in the first arrangement mode or the second arrangement mode, it is not necessary that all of the electrophoresis particles 105 are in the same direction or posture. For example, some of the electrophoresis particles 105 may be in one direction or posture while the other electrophoresis particles 105 may be in another direction or posture. Alternatively, all of the electrophoresis particles 105 may be in the same direction or posture.

In an embodiment, the electrophoresis particles 105 may be in a shape of spherical segment. For example, the electrophoresis particles 105 may be in a shape of hemisphere. It is helpful to change the arrangement modes of the electrophoresis particles 105, for example by inverting, while taking account into light absorbing or reflecting areas of the electrophoresis particles 105.

In an embodiment, the display panel 100 may allow the odd numbered rows or even numbered rows of pixel units to display individually, so as to achieve a single sided display. At this time, the first electrophoresis units 104a or the second electrophoresis units 104b corresponding to the odd numbered rows or even numbered rows of the pixel units 103 in the display state reflect the light emitted from the pixel units 103 while the second electrophoresis units 104b or the first electrophoresis units 104a corresponding to the pixel units 103 in the non-display state absorb the ambient light. As an example, the display panel 100 may also drive the odd numbered rows and even numbered rows of the pixel units 103 in time-sharing to carry out the display operation alternatively. In this example, the odd numbered rows and even numbered rows of the pixel units 103 have different display directions to achieve the double sided display. Likewise, the first electrophoresis units 104a or the second electrophoresis units 104b corresponding to the odd numbered rows or even numbered rows of the pixel units 103 in the display state reflect the light emitted from the pixel units 103 while the second electrophoresis units 104b or the first electrophoresis units 104a corresponding to the pixel units 103 in the non-display state absorb the ambient light. As an example, the first electrophoresis units 104a and the second electrophoresis units 104b may be driven along with the odd numbered rows or even numbered rows of the pixel units 103. The time-sharing driving of the odd numbered rows or even numbered rows of the pixel units 103 is well known for the skilled person in the art. Thus, its details are omitted herein.

As an example, as illustrated in FIG. 2, the electrophoresis particle 105 may have a spherical segment portion 105a and a reflective layer 1052 at a bottom of the spherical segment portion 105a, the spherical segment portion 105a having a spherical surface which is a light absorbing surface 1051. As an example, the light absorbing surface 1051 may be black while the reflective layer 1052 may be white.

Figure 3:
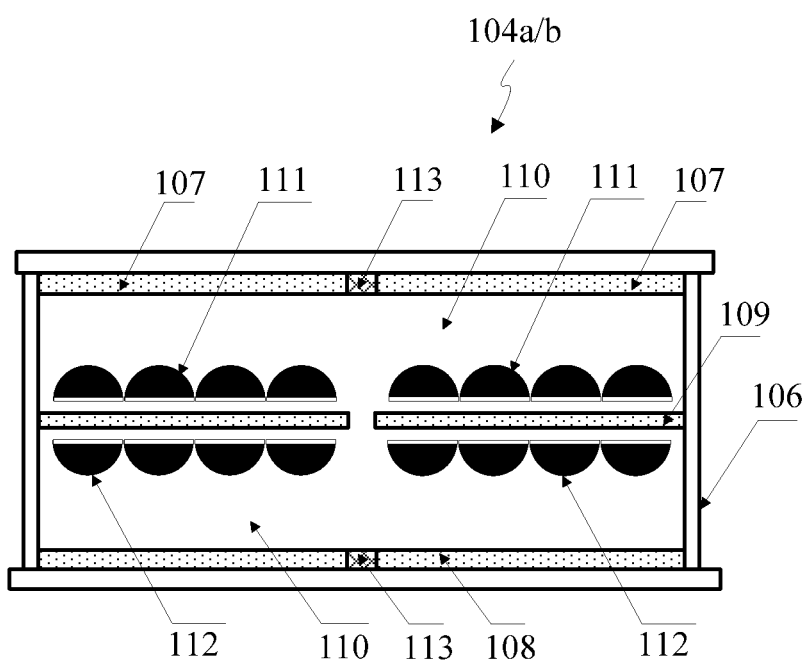
FIG. 3 is an illustrative structure view of a first or second electrophoresis unit according to an embodiment of the present invention.

FIG. 3 shows schematically a structure of the first electrophoresis units 104a/the second electrophoresis units 104b. Each electrophoresis unit of the first and second electrophoresis units may comprise a chamber 106 filled with a transparent liquid 110. The chamber 106 may have an upper wall with a first transparent electrode layer 107 and a lower wall with a second transparent electrode layer 108, and a third transparent electrode layer 109 may be located between the first transparent electrode layer 107 and the second transparent electrode layer 108. The first transparent electrode layer 107, the second transparent electrode layer 108 and the third transparent electrode layer 109 may be spaced apart by the transparent liquid 110. As an example, the chamber 106 may be full of the transparent liquid 110.

As an example, the first electrophoresis units 104a and the second electrophoresis units 104b may have the substantially same structure.

As an example, the electrophoresis particles 105 may include first electrophoresis particles 111 and second electrophoresis particles 112, the first electrophoresis particles 111 and the second electrophoresis particles 112 having opposite whole polarities to each other.

As an example, the first electrophoresis particles 111 are located between the first transparent electrode layer 107 and the third transparent electrode layer 109 and the second electrophoresis particles 112 are located between the second transparent electrode layer 108 and the third transparent electrode layer 109. Or, the second electrophoresis particles 112 are located between the first transparent electrode layer 107 and the third transparent electrode layer 109 and the first electrophoresis particles 111 are located between the second transparent electrode layer 108 and the third transparent electrode layer 109.

As an example, the reflective layers 1052 of the first electrophoresis particles 111 face towards the reflective layers 1052 of the second electrophoresis particles 112 in the electrophoresis units corresponding to the pixel units 103 in the non-display state. For example, when the display panel 100 is in the non-display state in whole, in all of the first electrophoresis units 104a and second electrophoresis units 104b, the reflective layers 1052 of the first electrophoresis particles 111 face towards the reflective layers 1052 of the second electrophoresis particles 112. In contrast, the reflective layers 1052 of the first electrophoresis particles 111 and the reflective layers 1052 of the second electrophoresis particles 112 in the electrophoresis units corresponding to the pixel units 103 in the display state both face towards the pixel units 103.

In an embodiment, each of the first transparent electrode layer 107 and the second transparent electrode layer 108 includes two transparent electrodes and a masking bar 113 is provided between two transparent electrodes in the same electrode layer.

In order that the first electrophoresis units 104a/the second electrophoresis units 104b corresponding to the pixel units 103 in the display state reflect the light emitted from the pixel units 103 while the first electrophoresis units 104a/the second electrophoresis units 104b corresponding to the pixel units 103 in the non-display state absorb the ambient light. As an example, the spherical segment portions of the first electrophoresis particles 111 have positive polarities while the reflective layers 1052 of the first electrophoresis particles 111 have negative polarities and the first electrophoresis particles 111 have negative polarities in whole. And further, the spherical segment portions of the second electrophoresis particles 112 have negative polarities while the reflective layers 1052 of the second electrophoresis particles 112 have positive polarities and the second electrophoresis particles 112 have positive polarities in whole. Or, as an example, the spherical segment portions of the first electrophoresis particles 111 have negative polarities while the reflective layers 1052 of the first electrophoresis particles 111 have positive polarities and the first electrophoresis particles 111 have positive polarities in whole. And further, the spherical segment portions of the second electrophoresis particles 112 have positive polarities while the reflective layers 1052 of the second electrophoresis particles 112 have negative polarities and the second electrophoresis particles 112 have negative polarities in whole. Typically, the spherical segment portion and the light absorbing surface 1051 are integrated, thus the light absorbing surface 1051 has the same polarity as that of the spherical segment portion.

Meanwhile, it should be noted that the spherical surfaces of the spherical segment portions of the first electrophoresis particles 111 and the second electrophoresis particles 112 both absorb the ambient light in external when the reflective layers 1052 of the first electrophoresis particles 111 face towards the reflective layers 1052 of the second electrophoresis particles 112, i.e., the electrophoresis particles 105 are in the second arrangement mode, which is benefit to improve the contrast. In contrast, the reflective layers 1052 of the first electrophoresis particles 111 and the second electrophoresis particles 112 may both reflect the light emitted from the pixel units 103 when the reflective layers 1052 of the first electrophoresis particles 111 and the reflective layers 1052 of the second electrophoresis particles 112 face towards the pixel units 103, i.e., the electrophoresis particles 105 are in the first arrangement mode, which is benefit to improve the display brightness.

As an example, change of the arrangement modes of the electrophoresis particles 105 may be achieved by inverting the first electrophoresis particles 111 and/or the second electrophoresis particles 112.

As an example, the number of the first electrophoresis particles 111 is equal to the number of the second electrophoresis particles 112 in a single electrophoresis unit. However, the present invention is not limited to this, for example, the number of the first electrophoresis particles 111 may alternatively be different from the number of the second electrophoresis particles 112.

An embodiment of the present invention may take the following advantageous effects: with the first electrophoresis units corresponding to the odd numbered rows of the pixel units provided on one side of the display panel and the second electrophoresis units corresponding to the even numbered rows of the pixel units provided on the other side of the display panel, the single sided display may be achieved by the odd numbered rows or even numbered rows of the pixel units by controlling the arrangement modes of the electrophoresis particles in the first and/or second electrophoresis units. Or, the double sided display may be achieved by controlling the odd numbered rows and even numbered rows of the pixel units in a time-sharing manner. Meanwhile, the light emitted from the pixel units in the display state may be reflected while the ambient light passing through the pixel units in the non-display state may be absorbed, which may improve the display brightness and ambient light contrast of the display panel.

An embodiment of the present invention also provides a display apparatus comprising the display panel as described in any one of the embodiments.

An embodiment of the present invention also provides a display method for a display panel. The display panel may be that described in any one of the embodiments. The display method includes:

controlling the arrangement modes of the electrophoresis particles 105 in the first electrophoresis units 104a and/or the second electrophoresis units 104b such that the electrophoresis particles 105 in the electrophoresis units corresponding to the pixel units 103 in the display state are in the first arrangement mode while the electrophoresis particles 105 in the electrophoresis units corresponding to the pixel units 103 in the non-display state are in the second arrangement mode.

As an example, in relation to the embodiment of the first/second electrophoresis units as shown in FIG. 3, in the method, the step of controlling the arrangement modes of the electrophoresis particles may comprise:

if a pixel unit is in the display state, applying a control voltage to the third transparent electrode layer such that the reflective layers of the first electrophoresis particles and the reflective layers of the second electrophoresis particles in the electrophoresis unit corresponding to the pixel unit both face towards the pixel unit in the display state to make the reflective layers of the first electrophoresis particles and the reflective layers of the second electrophoresis particles reflect the light emitted from the pixel unit in the display state.

As an example, in the method, the step of controlling the arrangement modes of the electrophoresis particles may further comprise:

if a pixel unit is in the non-display state, removing or not applying a control voltage to the third transparent electrode layer such that the reflective layers of the first electrophoresis particles face towards the reflective layers of the second electrophoresis particles to make the spherical segment portions of the first electrophoresis particles or the spherical segment portions of the second electrophoresis particles absorb the ambient light passing through the pixel unit in the non-display state corresponding to the electrophoresis unit.

In case that the first electrophoresis particles and the second electrophoresis particles have opposite whole polarities to each other, the whole polarities of the first electrophoresis particles and the second electrophoresis particles may be:

the spherical segment portions of the first electrophoresis particles have positive polarities while the reflective layers of the first electrophoresis particles have negative polarities and the first electrophoresis particles have negative polarities in whole; and the spherical segment portions of the second electrophoresis particles have negative polarities while the reflective layers of the second electrophoresis particles have positive polarities and the second electrophoresis particles have positive polarities in whole; or the spherical segment portions of the first electrophoresis particles have negative polarities while the reflective layers of the first electrophoresis particles have positive polarities and the first electrophoresis particles have positive polarities in whole; and the spherical segment portions of the second electrophoresis particles have positive polarities while the reflective layers of the second electrophoresis particles have negative polarities and the second electrophoresis particles have negative polarities in whole.

Thus, when any one electrophoresis particle of the first electrophoresis particles and the second electrophoresis particles needs to be inverted, their polarities in absence of the control voltage applied to the third transparent electrode layer need to be set depending on the above two cases of the first electrophoresis particles and the second electrophoresis particles.

For example, the spherical segment portions of the first electrophoresis particles have positive polarities while the reflective layers of the first electrophoresis particles have negative polarities and the first electrophoresis particles have negative polarities in whole; and the spherical segment portions of the second electrophoresis particles have negative polarities while the reflective layers of the second electrophoresis particles have positive polarities and the second electrophoresis particles have positive polarities in whole.

In this circumstance, if the second electrophoresis particles need to be inverted, a positive voltage is applied to the third transparent electrode layer such that the first electrophoresis particles are not inverted while the second electrophoresis particles are inverted; and if the first electrophoresis particles need to be inverted, a negative voltage is applied to the third transparent electrode layer such that the second electrophoresis particles are not inverted while the first electrophoresis particles are inverted.

An embodiment of the present invention may take the following advantageous effects: with the first electrophoresis units corresponding to the odd numbered rows of the pixel units provided on one side of the display panel and the second electrophoresis units corresponding to the even numbered rows of the pixel units provided on the other side of the display panel, the single sided display may be achieved through the odd numbered rows or even numbered rows of the pixel units by controlling the arrangement modes of the electrophoresis particles in the first and/or second electrophoresis units. Or, the double sided display may be achieved by controlling the odd numbered rows and even numbered rows of the pixel units in the time-sharing manner. Meanwhile, the light emitted from the pixel units in the display state may be reflected while the ambient light passing through the pixel units in the non-display state may be absorbed, which may improve the display brightness and ambient light contrast of the display panel.

Although several exemplary embodiments have been shown and described, the present invention is not limited to those and it would be appreciated by those skilled in the art that various changes or modifications may be made in these embodiments without departing from the principles and spirit of the disclosure, the scope of which is defined in the claims and their equivalents.

What is claimed is:

1. A display panel, comprising:
   a first transparent substrate and a second transparent substrate opposed to each other;
   a plurality of double sided light emitting pixel units located between the first transparent substrate and the second transparent substrate and arranged in a matrix;
   a plurality of first electrophoresis units located outside of the first transparent substrate and corresponding to odd numbered rows of the pixel units one by one;
   a plurality of second electrophoresis units located outside of the second transparent substrate and corresponding to even numbered rows of the pixel units one by one,
   wherein each of the first electrophoresis units and the second electrophoresis units comprises a plurality of electrophoresis particles having a first arrangement mode and a second arrangement mode, and
   wherein in response to the electrophoresis particles in any first one electrophoresis unit of the first electrophoresis units and the second electrophoresis units being in the first arrangement mode, the first one electrophoresis unit reflects a light emitted from the pixel unit corresponding to the first one electrophoresis unit, while in response to the electrophoresis particles in any second one electrophoresis unit of the first electrophoresis units and the second electrophoresis units being in the second arrangement mode, the second one electrophoresis unit absorbs an ambient light passing through the pixel unit corresponding to the second one electrophoresis unit.

2. The display panel according to claim 1, wherein the first electrophoresis units and/or the second electrophoresis units are configured to control the arrangement modes of the electrophoresis particles such that the electrophoresis particles in the electrophoresis units corresponding to the pixel units in a display state are in the first arrangement mode, while the electrophoresis particles in the electrophoresis units corresponding to the pixel units in a non-display state are in the second arrangement mode.

3. The display panel according to claim 1, wherein the electrophoresis particles are in a shape of spherical segment.

4. The display panel according to claim 3, wherein the electrophoresis particles are in a shape of hemisphere.

5. The display panel according to claim 1, wherein each electrophoresis unit of the first and second electrophoresis units further comprises a chamber filled with a transparent liquid, the chamber comprising an upper wall with a first transparent electrode layer and a lower wall with a second transparent electrode layer, and a third transparent electrode layer being located between the first transparent electrode layer and the second transparent electrode layer, and the first, second and third transparent electrode layers being spaced apart by the transparent liquid;
   wherein the electrophoresis particles comprise first electrophoresis particles and second electrophoresis particles, the first electrophoresis particles and the second electrophoresis particles having opposite whole polarities to each other;
   wherein the first electrophoresis particles are located between the first transparent electrode layer and the third transparent electrode layer, and the second electrophoresis particles are located between the second transparent electrode layer and the third transparent electrode layer; or
   the second electrophoresis particles are located between the first transparent electrode layer and the third transparent electrode layer, and the first electrophoresis particles are located between the second transparent electrode layer and the third transparent electrode layer.

6. The display panel according to claim 5, wherein each of the first transparent electrode layer and the second transparent electrode layer comprises two transparent electrodes and a masking bar is provided between the two transparent electrodes in the same electrode layer.

7. The display panel according to claim 5, wherein each electrophoresis particle of the first electrophoresis particles and the second electrophoresis particles has a spherical segment portion and a reflective layer provided at a bottom of the spherical segment portion, the spherical segment portion having a spherical surface which is a light absorbing surface.

8. The display panel according to claim 7, wherein in the electrophoresis units corresponding to the pixel units in the non-display state, the reflective layers of the first electrophoresis particles face towards the reflective layers of the second electrophoresis particles, while the reflective layers of the first electrophoresis particles and the reflective layers of the second electrophoresis particles in the electrophoresis units corresponding to the pixel units in the display state both face towards the pixel units.

9. The display panel according to claim 7,
wherein the spherical segment portions of the first electrophoresis particles have positive polarities while the reflective layers of the first electrophoresis particles have negative polarities, and the first electrophoresis particles have negative polarities in whole; and the spherical segment portions of the second electrophoresis particles have negative polarities while the reflective layers of the second electrophoresis particles have positive polarities, and the second electrophoresis particles have positive polarities in whole, or
wherein the spherical segment portions of the first electrophoresis particles have negative polarities while the reflective layers of the first electrophoresis particles have positive polarities, and the first electrophoresis particles have positive polarities in whole; and the spherical segment portions of the second electrophoresis particles have positive polarities while the reflective layers of the second electrophoresis particles have negative polarities, and the second electrophoresis particles have negative polarities in whole.

10. The display panel according to claim 5, wherein a number of the first electrophoresis particles is equal to a number of the second electrophoresis particles in a single electrophoresis unit.

11. A display apparatus, comprising a display panel, the display panel comprising:
a first transparent substrate and a second transparent substrate opposed to each other;
a plurality of double sided light emitting pixel units located between the first transparent substrate and the second transparent substrate and arranged in a matrix;
a plurality of first electrophoresis units located outside of the first transparent substrate and corresponding to odd numbered rows of the pixel units one by one;
a plurality of second electrophoresis units located outside of the second transparent substrate and corresponding to even numbered rows of the pixel units one by one,
wherein each of the first electrophoresis units and the second electrophoresis units comprises a plurality of electrophoresis particles having a first arrangement mode and a second arrangement mode, and
wherein in response to the electrophoresis particles in any first one electrophoresis unit of the first electrophoresis units and the second electrophoresis units being in the first arrangement mode, the first one electrophoresis unit reflects a light emitted from the pixel unit corresponding to the first one electrophoresis unit, while in response to the electrophoresis particles in any second one electrophoresis unit of the first electrophoresis units and the second electrophoresis units being in the second arrangement mode, the second one electrophoresis unit absorbs an ambient light passing through the pixel unit corresponding to the second one electrophoresis unit.

12. The display apparatus according to claim 11, wherein the first electrophoresis units and/or the second electrophoresis units are configured to control the arrangement modes of the electrophoresis particles such that the electrophoresis particles in the electrophoresis units corresponding to the pixel units in a display state are in the first arrangement mode while the electrophoresis particles in the electrophoresis units corresponding to the pixel units in a non-display state are in the second arrangement mode.

13. The display apparatus according to claim 11, wherein each electrophoresis unit of the first and second electrophoresis units further comprises a chamber filled with a transparent liquid, the chamber comprising an upper wall with a first transparent electrode layer and a lower wall with a second transparent electrode layer, and a third transparent electrode layer being located between the first transparent electrode layer and the second transparent electrode layer, and the first, second and third transparent electrode layers being spaced apart by the transparent liquid;
wherein the electrophoresis particles comprise first electrophoresis particles and second electrophoresis particles, the first electrophoresis particles and the second electrophoresis particles having opposite whole polarities to each other;
wherein the first electrophoresis particles are located between the first transparent electrode layer and the third transparent electrode layer and the second electrophoresis particles are located between the second transparent electrode layer and the third transparent electrode layer; or the second electrophoresis particles are located between the first transparent electrode layer and the third transparent electrode layer and the first electrophoresis particles are located between the second transparent electrode layer and the third transparent electrode layer.

14. The display apparatus according to claim 13, wherein each of the first transparent electrode layer and the second transparent electrode layer comprises two transparent electrodes and a masking bar is provided between the two transparent electrodes in the same electrode layer.

15. The display apparatus according to claim 13, wherein each electrophoresis particle of the first electrophoresis particles and the second electrophoresis particles has a spherical segment portion and a reflective layer provided at a bottom of the spherical segment portion, the spherical segment portion having a spherical surface which is a light absorbing surface.

16. The display apparatus according to claim 15, wherein in the electrophoresis units corresponding to the pixel units in the non-display state, the reflective layers of the first electrophoresis particles face towards the reflective layers of the second electrophoresis particles, while the reflective layers of the first electrophoresis particles and the reflective layers of the second electrophoresis particles in the electrophoresis units corresponding to the pixel units in the display state both face towards the pixel units.

17. The display apparatus according to claim 15,
wherein the spherical segment portions of the first electrophoresis particles have positive polarities while the reflective layers of the first electrophoresis particles have negative polarities, and the first electrophoresis particles have negative polarities in whole; and the spherical segment portions of the second electrophoresis particles have negative polarities while the reflective layers of the second electrophoresis particles have positive polarities, and the second electrophoresis particles have positive polarities in whole, or
wherein the spherical segment portions of the first electrophoresis particles have negative polarities while the reflective layers of the first electrophoresis particles have positive polarities, and the first electrophoresis particles have positive polarities in whole; and the spherical segment portions of the second electrophoresis particles have positive polarities while the reflective layers of the second electrophoresis particles have negative polarities, and the second electrophoresis particles have negative polarities in whole.

18. A display method for a display panel, the display panel comprising:
- a first transparent substrate and a second transparent substrate opposed to each other;
- a plurality of double sided light emitting pixel units located between the first transparent substrate and the second transparent substrate and arranged in a matrix;
- a plurality of first electrophoresis units located outside of the first transparent substrate and corresponding to odd numbered rows of the pixel units one by one;
- a plurality of second electrophoresis units located outside of the second transparent substrate and corresponding to even numbered rows of the pixel units one by one, and
- wherein each of the first electrophoresis units and the second electrophoresis units comprises a plurality of electrophoresis particles having a first arrangement mode and a second arrangement mode, the method comprising:
- in response to the electrophoresis particles in any first one electrophoresis unit of the first electrophoresis units and the second electrophoresis units being in the first arrangement mode, the first one electrophoresis unit reflects a light emitted from the pixel unit corresponding to the first one electrophoresis unit, while in response to the electrophoresis particles in any second one electrophoresis unit of the first electrophoresis units and the second electrophoresis units being in the second arrangement mode, the second one electrophoresis unit absorbs an ambient light passing through the pixel unit corresponding to the one electrophoresis unit, and
- controlling the arrangement modes of the electrophoresis particles such that the electrophoresis particles in the electrophoresis units corresponding to the pixel units in a display state are in the first arrangement mode while the electrophoresis particles in the electrophoresis units corresponding to the pixel units in a non-display state are in the second arrangement mode.

19. The method according to claim 18, wherein each electrophoresis unit of the first and second electrophoresis units further comprises a chamber filled with a transparent liquid, the chamber comprising an upper wall with a first transparent electrode layer and a lower wall with a second transparent electrode layer, and a third transparent electrode layer being located between the first transparent electrode layer and the second transparent electrode layer, and the first, second and third transparent electrode layers being spaced apart by the transparent liquid;

wherein the electrophoresis particles comprise first electrophoresis particles and second electrophoresis particles, the first electrophoresis particles and the second electrophoresis particles having opposite whole polarities to each other;

wherein the first electrophoresis particles are located between the first transparent electrode layer and the third transparent electrode layer and the second electrophoresis particles are located between the second transparent electrode layer and the third transparent electrode layer; or the second electrophoresis particles are located between the first transparent electrode layer and the third transparent electrode layer and the first electrophoresis particles are located between the second transparent electrode layer and the third transparent electrode layer, each electrophoresis particle of the first electrophoresis particles and the second electrophoresis particles has a spherical segment portion and a reflective layer provided at a bottom of the spherical segment portion, the spherical segment portion having a spherical surface which is a light absorbing surface, in the method, the step of controlling the arrangement modes of the electrophoresis particles comprises:

in response to a pixel unit being in a display state, applying a control voltage to the third transparent electrode layer such that the reflective layers of the first electrophoresis particles and the reflective layers of the second electrophoresis particles in the electrophoresis unit corresponding to the pixel unit both face towards the pixel unit to make the reflective layers of the first electrophoresis particles and the reflective layers of the second electrophoresis particles reflect the light emitted from the pixel unit in the display state.

20. The method according to claim 18, wherein each electrophoresis unit of the first and second electrophoresis units further comprises a chamber filled with a transparent liquid, the chamber comprising an upper wall with a first transparent electrode layer and a lower wall with a second transparent electrode layer, and a third transparent electrode layer being located between the first transparent electrode layer and the second transparent electrode layer, and the first, second and third transparent electrode layers being spaced apart by the transparent liquid;

wherein the electrophoresis particles comprise first electrophoresis particles and second electrophoresis particles, the first electrophoresis particles and the second electrophoresis particles having opposite whole polarities to each other;

wherein the first electrophoresis particles are located between the first transparent electrode layer and the third transparent electrode layer and the second electrophoresis particles are located between the second transparent electrode layer and the third transparent electrode layer; or the second electrophoresis particles are located between the first transparent electrode layer and the third transparent electrode layer and the first electrophoresis particles are located between the second transparent electrode layer and the third transparent electrode layer, each electrophoresis particle of the first electrophoresis particles and the second electrophoresis particles has a spherical segment portion and a reflective layer provided at a bottom of the spherical segment portion, the spherical segment portion having a spherical surface which is a light absorbing surface, in the method, the step of controlling the arrangement modes of the electrophoresis particles comprises:

in response to a pixel unit being in a non-display state, not applying a control voltage to the third transparent electrode layer such that the reflective layers of the first electrophoresis particles face towards the reflective layers of the second electrophoresis particles to make the spherical segment portions of the first electrophoresis particles and the spherical segment portions of the second electrophoresis particles absorb the ambient light passing through the pixel unit in the non-display state corresponding to the electrophoresis unit.

* * * * *